United States Patent
Patel et al.

(10) Patent No.: US 6,373,732 B1
(45) Date of Patent: Apr. 16, 2002

(54) APPARATUS AND METHOD FOR PARALLEL SYNCHRONOUS POWER CONVERTERS

(75) Inventors: Raoji A. Patel, Framingham, MA (US); Raymond A. Pelletier, Goffstown; Robert J. Wolf, Nashua, both of NH (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/496,166

(22) Filed: Feb. 1, 2000

(51) Int. Cl.[7] .............................................. H02M 7/217
(52) U.S. Cl. ....................................................... 363/72
(58) Field of Search ........................... 363/71, 89, 127, 363/72

(56) References Cited

U.S. PATENT DOCUMENTS 5,956,245 A * 9/1999 Rozman ...................... 363/89

* cited by examiner

*Primary Examiner*—Shawn Riley
(74) *Attorney, Agent, or Firm*—Hamilton, Brook, Smith & Reynolds, P.C.

(57) ABSTRACT

A method of preventing current hogging in parallel connected transformers, and an apparatus for efficiently implementing the method are presented. Current hogging occurs when synchronous power converter transformers operate in a low output current mode. Low output current demands are typically meet by adjusting the duty cycle of the transformer to a low level. This results in the catch FET maintaining a low resistance path to ground for long time periods and allows a stronger one of the parallel power converter transformers to sink current to ground through a weaker transformer. The method consists of using a current sensor to detect low or negative output currents, and then driving the transistor providing the path to ground to an off state. A preferred embodiment of an apparatus to prevent current hogging includes a current sense inductor placed in series with the primary side of the power converter connected to an operational amplifier having an input reference voltage selected to provide an output when the current sense inductor records less than a certain positive voltage. The op amp turns on a driver to force off a transistor which normally conducts to ground when the duty cycle is in an off state.

18 Claims, 2 Drawing Sheets

APPARATUS AND METHOD FOR PARALLEL SYNCHRONOUS POWER CONVERTERS

BACKGROUND OF THE INVENTION

It is well known to provide electrical and electronic devices, such as electric motors and computers, with a variable voltage power supply by varying the duty cycle of a power converter attached to an initial voltage source. For example, a five volt direct current (i.e., DC) source may be effectively converted into a 2 volt output by simply using a switch, such as a transistor, to turn the current on for 40 milliseconds (i.e., 40 ms) and then off for 60 ms, etc. This would be known as a 40% duty cycle. The 5 volt square wave output of the transistor, typically either a Bipolar transistor or a MOS transistor, after passing through a capacitor, resistor and inductor network to smooth out variations, will effectively result in an DC voltage of 0.40 times 5 volts, or 2 volts DC. The same method of varying the duty cycle may be used to provide essentially any desired voltage level up to the value of the initial voltage, in this example 5 volts DC. This type of apparatus is known as a power converter.

Alternatively, the initial power supply may be an alternating current (i.e., AC) and not a DC supply. AC voltages are typically 120 to 240 volts, and so it is common to use a transformer to step down the voltage to a level more compatible with electronic devices. In this example, the 120 volt primary side of a transformer might have a coil with 24 turns, and the secondary side transformer coil would then have only a single turn, and thus provide 5 volts to a switch on the secondary side of the transformer. Then, as in the previous example, the duty cycle is selected to provide the desired output voltage. With a cycle rate Q used to synchronize both sides of the transformer resulting in a peak to peak time period of Tau, and a switch on period of "t", the output voltage of the power converter is then given by the expression Vout=Vin X (t/Tau). Note that the AC supply is generally transformed into a pseudo DC voltage by the use of diodes on the secondary side of the transformer, which convert the sinusoidal waves into positive voltage square waves, plus the use of smoothing filters.

In order to match the maximum amount of power needed in any particular circuit or electrical device to the maximum power limit of the individual power converters, it is common to use multiple power converters connected in parallel to achieve the desired current capacity. This arrangement is useful because there is an increased current flow on the secondary side in a voltage step down transformer, and thus a possibility of power converter over heating and burnout exists. A problem that exists with this parallel arrangement of power supplies is that the parallel power supplies may not share the load precisely. When the output load is small, then it is possible that one of the parallel power converters may not be exactly as strong as the others, and power may feedback through that one power converter to the transformer. This is a positive feedback mechanism and may result in the higher powered converters drawing more and more power until burnout occurs. This problem is known as current hogging, and it would be a benefit to provide an arrangement of parallel power converters that did not suffer from current hogging when operating in a state where the output current demands are low.

SUMMARY OF THE INVENTION

An apparatus for providing synchronous power to an electrical or electronic device without current hogging, comprises power converters connected in parallel, with each converter having a circuit for sensing the current flow direction and value at either a location on the primary side of the transformer, or on the secondary side of the transformer. In an embodiment of the invention, each one of the sensing circuits can switch the converter to an inactive state when current hogging causes feedback that may reach the transformer and cause a positive feedback cycle. With such an arrangement the feedback loop and consequent overheating and burnout may be avoided by disabling the affected converter.

In a preferred embodiment of the invention, the converters are all synchronized to the primary transformer side modulator using a first series connected MOSFET, and a second parallel connected MOSFET catch transistor. The catch FET is preferably either 180 degrees out of phase with the modulator, or driven by a pulse width modulator. The feedback cutoff is preferably implemented by an additional driver for the second transistor which is controlled by the output of an operational amplifier comparing the current sensor value versus a reference voltage.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
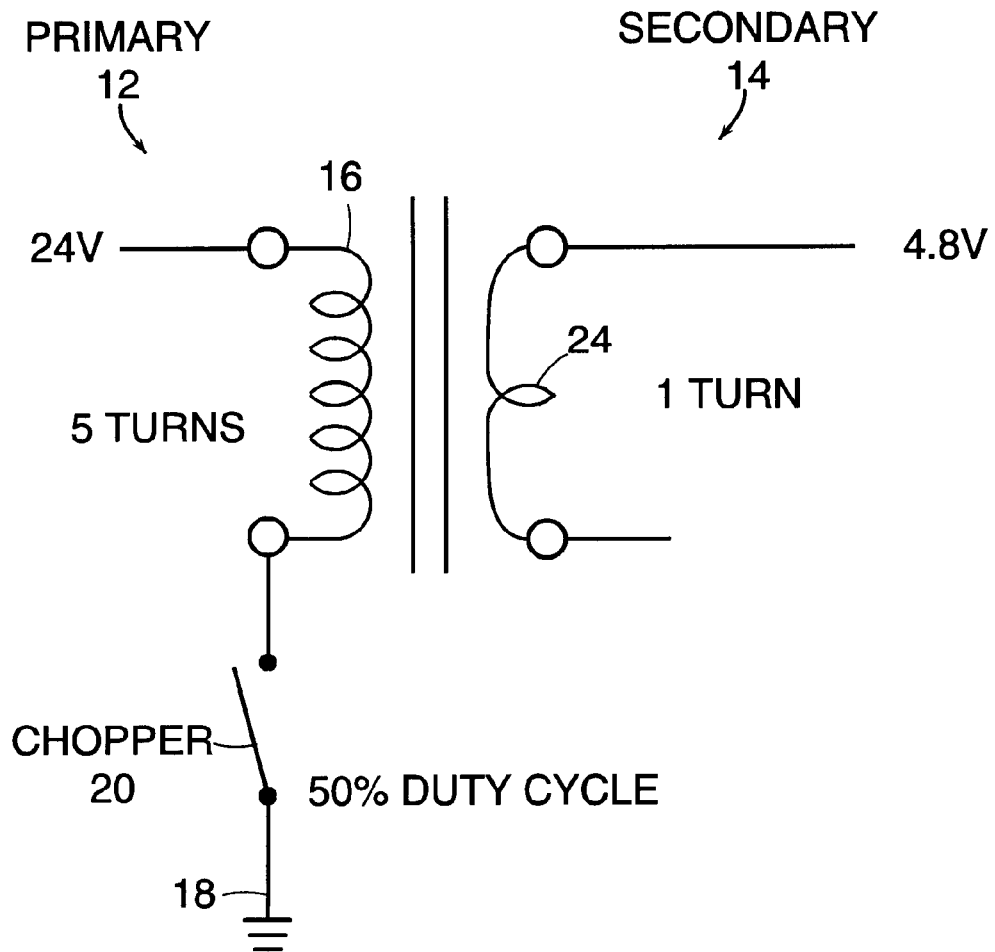
FIG. 1 is a schematic of a voltage step down transformer.
Figure 1:
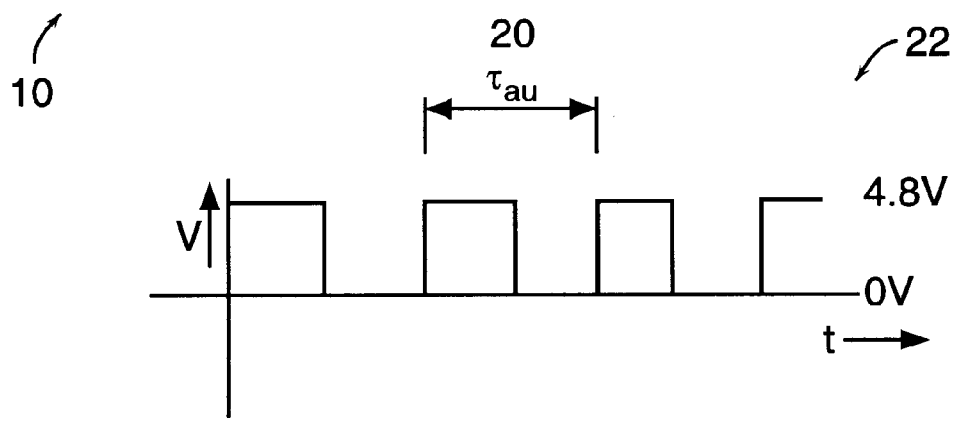

FIG. 1 shows a voltage step down transformer 10 having a primary side 12 and a secondary side 14. The primary transformer side in this illustration has a five turn coil 16 biased at 24 volts above the ground connection 18. The primary side current is started and stopped by what is known as a chopper circuit 20, shown as having a 50% duty cycle, meaning that the circuit is closed half of the time, and open half of the time. The duty cycle of the circuit may be adjusted either higher or lower than 50% depending on voltage output desired. The circuit 20 will have a peak to peak cycle period Tau 20, shown in the timing diagram 22, that is adjustable to provide appropriately smooth output current depending upon the inherent values of the transformer, inductance, resistance, capacitance, and the output load value.

The secondary side of the transformer 10 has a single turn coil 24 such that the ratio of primary to secondary turns results in a secondary side voltage of 4.8 volts. It should be noted that the voltage step down is obtained at the cost of a current increase on the secondary side of the transformer circuit. Also note that the square wave output shown in timing diagram 22 may be spread out and smoothed by passing the square waves through what is known as an LRC network, consisting of resistors, inductors and capacitors, until the 4.8 volt square waves shown in timing diagram 22 with a 50% duty cycle, will resemble a 2.4 volt direct current supply.

Figure 2:
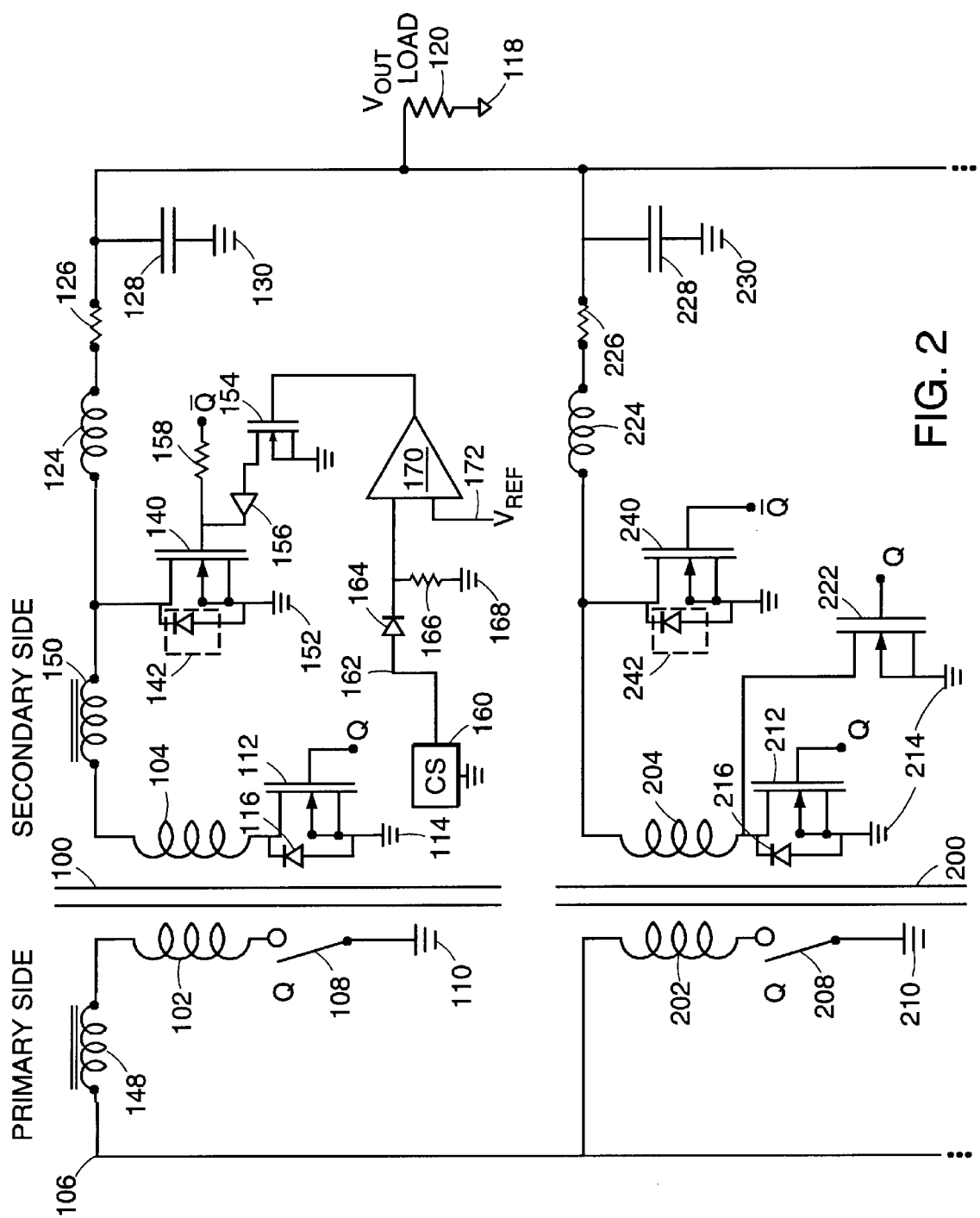
FIG. 2 is a circuit diagram of parallel voltage converters in accordance with the invention. While the description is for two parallel converters in parallel, the description applies to any number of converters operating in parallel.

FIG. 2 shows two parallel transformers 100 and 200, of a plurality of parallel connected transformers (not shown) with the transformer 100 shown having additional circuitry to prevent current hogging in accordance with the invention. The transformers 100, 200 have primary side coils 102, 202, each having a specified number of turns, and secondary side coils 104 and 204, each having a specified number of turns. In the case of a voltage step down transformer, the primary side coils 102, 202 will have a larger number of turns than will the secondary side coils 104, 204, the ratio of the number of turns being typically in proportion to the desired percentage of voltage reduction over the primary input voltage 106. In the case of an isolation transformer the number of turns on the primary side coils 102, 202 will be typically the same as the number of turns on the secondary side coils 104, 204. In the case of a voltage step up transformer the primary side coils 102, 202 will have a smaller number of turns than will the secondary side coils 104, 204, again in proportion to the desired voltage increase over the primary input voltage 106. The principles of the invention may be applied to any type of transformer or other magnetic device, but the description will limited to the voltage step down case due to lifetime and burnout issues.

Since a transformer operates by changing the current flow through an inductive element, FIG. 2 shows illustrative chopper switches 108, 208 which provide the changing current, in this illustrative embodiment a square wave on and off cycle as previously discussed with regard to FIG. 1, item 22. The choppers 108, 208 have an adjustable period Q which may be varied for frequency and duration to provide a variable duty cycle and period for output voltage and power control. The choppers 108, 208 are typically connected between the primary coils 102, 202 and a ground supply 110, 210. Note that ground connections 110 and 210 may be the same voltage source or different sources depending on the circuit requirements.

The secondary side of the transformers 100, 200 has transistors 112, 212 disposed between the coils 104, 204 and the ground connections 114, 214. Note that the ground connections 114, 214 may be the same ground supply, and may also be the same supply as the primary side connections 110, 210 depending on circuit requirements. Further note that while transistors 112, 212 are shown as N Channel MOSFETs, or NMOS transistors, the principles of the invention apply with P Channel MOSFETs or bipolar transistors, or any type of controllable current switch, such as vacuum tubes, etc. In the present embodiment, the MOS transistors 112, 212 are shown having parasitic diodes 116, 216, known as body diodes, connected from the source to drain and bypassing the gate regions of the transistors 112, 212. Body diodes are inherent parasitic parts of any MOS type transistor, and are shown in this illustrative embodiment to clarify the method of operation of the circuit. When a MOSFET such as 112 is turned off and is in a non conductive state, it essentially becomes a diode such as the parasitic body diode 116.

The purpose of the transistors 112, 212 is to block current flow from the secondary side coils 104, 204 to the ground supply connections 114, 214 when the transistor 108, 208 are in the off state, i.e., when Q is not positive valued. This is the same time period during which the primary side coils 102, 202 are conducting current under the control of the choppers 108, 208, and thus act to keep the current flow toward the load resistor 120 to a positive value. This current direction control action, or back flow prevention, may also be performed using a diode in place of the transistors 112, 212, but the typical forward bias voltage loss of a diode may be 0.30 volts to 0.70 volts, and a transistor may only have a 0.060 volt forward voltage loss. Thus the use of a transistor rather than a diode will result in lower transformer current consumption and thus improved transformer thermal operation. It is possible to further reduce the forward voltage loss and increase current handling capability by using parallel transistors. FIG. 2 shows this parallel transistor arrangement in transformer 200 with transistor 222 connected in parallel to transistor 212. While only two transistors are shown connected in parallel in this illustrative embodiment, reduced voltage drop and resistance, and increased current handling ability will result from additional transistors added in parallel to those shown, 212 and 222. Further any of the transistors in FIG. 2 may have parallel transistors connected in parallel to improve the resistance and current handling performance.

The output current flowing from the secondary coils 104, 204 toward the output load 120 will typically be discontinuous due to the transient nature of the driving source, the primary coils 102, 202, as well as the on and off switching nature of the choppers 108, 208 denoted by the control value Q. Typically the desired output of the transformer is a continuous direct current, so the current is smoothed and filtered in an LRC network comprising what are known as lumped elements 124, 224 for inductance, 126, 226 for resistance, and 128, 228 for capacitance in the illustrative transformers 100 and 200 respectively. The capacitance 128, 228 is typically connected in parallel to the output load 120 and connected to a ground supply, 130, 230. Note that the ground connections 130, 230 may be the same ground as the output load ground 118, or the same ground as any of the previously noted ground connections, 110, 210, 114, 214 depending on circuit or device requirements.

The inductance 124, 224, resistance 126, 226 and capacitance 128, 228 elements used in the voltage smoothing or filtering portion of transformers 100, 200, are charged up during the on period, i.e., when Q is on, thus reducing the peak voltage and smoothing the square wave current from the secondary coils 104, 204. When Q is off, i.e., the current from the secondary coils 104,204 is zero, current which was flowing in the output induction 124, 224 continues to flow through the output inductor 124, 224 and the synchronous rectifier 140, 240, effectively becoming a temporary current source, thus continuing to supply energy to the output, thus again smoothing out voltage variations. The source of the current can not be the ground connections 114, 214 since the transistors 112, 212 are off and nonconductive when Q is off. The body diodes 116 and 216 are not effective current sources due to the high forward bias previously discussed, and the high resistance of many parasitic diodes.

To provide the current source for the Q off time period, a second transistor 140, 240 may be added to the transformer, typically between the secondary coils 104, 204 and the filtering inductance 124, 224. The transistors 140, 240 will be driven high when Q is off, commonly referred to as Qbar, and indicated as a horizontal line over a Q. Transistors 140, 240 also have parasitic body diodes 142, 242 that connect the source and drain regions, shown surrounded by dotted lines to indicate that they are not actual components of the circuit. Transistors 140, 240 allow current flow under the influence of the filter inductors 124, 224 during the time period when Q is off, thus contributing to the smoothing of the input voltage.

A problem exists during low current usage periods when the output load 120 is off or in some other low power operational mode. Effectively this is when the output load resistor 120 has a high resistance value. For example, the transformer 200 may not be exactly matched with transformer 100 for current drive capability, and may be stronger than transformer 100. Thus as the output current decreases (i.e., the resistance 120 increases), the current provided for the output load 120 by the stronger transformer 200 may induce a backward current flow in the weaker transformer 100. This occurs when the duty cycle of the transformers 100, 200 is very low, meaning that Q is rarely on, and that Qbar is on most of the time. When Qbar is on, the FET 140 in the weaker transformer 100 provides a lower resistance path to ground 152 for current provided by transformer 200 than does the output load resistor 120. Since the transformer 200 detects that there is a current demand at its output, the transformer 200 increases it duty cycle Q to provide the apparent current requirement. This can continue until the transformer 200 exceeds its rated current capability, and burnout occurs. The increasing output current from transformer 200 may also cause damage to weaker transformer 100. This is a form of a current runaway situation known as current hogging, since one transformer of the parallel connected transformers takes more and more of the current.

Other potential circuit problems occur in addition to current hogging. If this current back flow occurs during the time period when the current from secondary coils 104, 204 should be at zero, i.e., Q is off but Qbar is on, then the back current will begin to preferentially go to ground 152 through the lower resistance path of transistor 140, and some of the current may charge the secondary inductor coil 104 of the weaker transformer 100, thus causing an unexpected current in the primary coil 102. While the transistors 112, 212 will prevent most of this back flow current from reaching the ground connections 114, 214, the secondary coils 104, 204 may still develop a magnetic field in the opposite direction of the desired field. This magnetic field will induce an undesirable current in the primary coils 102, 202. In this state of Q being off, the current can not travel to primary ground 110 since switch 108 is in the open position. Thus a power surge will be experienced on the power supply 106. The power surge may cause the primary side of transformer 200 to increase in power, resulting in a further strengthening of the output of transformer 200, and consequent increased back current flow in the transformer 100, and so on resulting in circuit disruption.

It is possible to detect the low load and no load states that may result in one transformer current hogging, by the use of current sensors in or near the transformer circuit. Such current sensors may be implemented in the form of a sense transformer either on the primary side of the transformer, or on the secondary side. FIG. 2 has current sensor 148 inserted between the initial power source 106 and the primary side coil 102. In this embodiment the sensor 148 would detect either the low current flow in transformer 100, or the reverse current flow from primary coil 102 during a Q off period, i.e., Qbar, and trigger a transformer inactivating circuit to cut off the back current. FIG. 2 alternately shows that the current sensor 150 may be on the secondary side of the transformer, typically between the secondary coil 104 and the transistor 140. The optimum choice of current sensor location depends on the required feedback cutoff speed and on the amount of current that the individual transformer can handle. Having the current sensor on the secondary side of the transformer in position 150 results in superior detection levels, but does require a current sensor that can pass larger amounts of current at lower voltages in our present voltage step down example. An isolation transformer or a voltage step up transformer will have different behavior and may require a different current sensor location. Note that the current sensor may also be used to trigger a circuit shut off when the detected current levels are not in the negative direction, but are below a level known to potentially cause current hogging. Using the low current limit, as opposed to the negative current case, results in faster transformer cutoff reaction times for potential current hogging situations.

The method of turning the affected transformer circuit off when either negative or low current situations occur may include simple mechanical or electronic switches, such as adding a blocking transistor between the filter inductor 124 and the secondary coil 104. Such blocking methods may have insufficient reaction time, i.e., an electro-mechanical switch, to prevent damaging power surges, or may introduce undesirable additional series resistance or insufficiently high blocking voltages, i.e., a FET.

In a preferred embodiment of the invention, the second transistor 140 is turned off and prevents the feed back current from reaching a ground supply 152, under the control of a driver 154, shown here as another NMOS transistor, and inverter 156. In effect the transistor 140 has been converted into the diode 142, which blocks the back current from reaching the ground connection 152 under normal voltage conditions. Note that the driver 154 may also be implemented in other ways, such as a bipolar transistor, or a SCR driver chip, as long as the driver 154 is sufficiently strong to overcome the usual transistor 140 input of Qbar. In the preferred embodiment the input Qbar has a resistance 158 which prevents the driver 154 signal from affecting other ones of the parallel transformers synchronization signals Q and Qbar.

The current hogging prevention circuit operates when a current sensor 160, which represents either the primary side sense transformer 148, the secondary side sense transformer 150, or some other current sensor, sends a signal on line 162 to diode 164. The output of diode 164 travels through resistor 166 to ground connection 168 since the operational amplifier 170 has effectively infinite input impedance. Ground connection 168 may be the same ground as the previously mentioned grounds, or an isolated ground. Op amp 170 will send an output to driver 154 when the current sensor 160 output is lower than a reference voltage 172. Driver 154 and inverter 156 can turn the transistor 140 off despite the presence of the on signal from Qbar through resistor 158, thereby creating a high resistance connection to ground for the back current. Note that this illustrative embodiment does not affect the synchronization signal controlling the duty cycle, and thus the transformer is not totally disabled, and may still provide power as required.

With such an arrangement a parallel transformer can be placed in an inactive state whenever the output load 120 becomes lower than a selected value, or goes negative, and current feed back may be prevented. With the feed back current blocked there is no current hogging problem and transformer lifetimes may be improved.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for providing synchronous power to an electronic device, comprising:

a plurality of power converters having a duty cycle and connected in parallel;

at least one of a plurality of circuits for sensing the current flow in each of the plurality of converters at a selected circuit location, each one of the plurality of circuits capable of switching one selected one of the plurality of converters from an active to an inactive state; and each one of the plurality of circuits disposed to switch the selected converter from the active to the inactive state to block current flow during a period when the duty cycle is in an off state in response to sensing a preselected output current value of the selected converter.

2. The apparatus of claim 1 wherein the preselected current flow value is a positive value.

3. The apparatus of claim 1 wherein further each one of the plurality of power converters comprises at least a secondary transformer coil and a first transistor disposed between the coil and ground.

4. The apparatus of claim 3 wherein the first transistor is a field effect transistor.

5. The apparatus of claim 3 wherein the first transistor is disposed to permit current flow in the coil only when the primary side of a transformer is operating in a positive region.

6. The apparatus of claim 5 wherein further a second transistor is disposed to permit current flow from the side of the coil opposite of the first transistor to ground when the primary side of a transformer is not operating in the positive region.

7. The apparatus of claim 6 wherein further a inductor, resistor and capacitor network is disposed between the coil and the converter output.

8. The apparatus of claim 6 wherein further the second transistor is further disposed to block current flow in response to sensing the preselected output current value of the converter.

9. The apparatus of claim 8 wherein the second transistor blocks current flow in response to the sensing is further under the control of a transistor driven by an operational amplifier at least having inputs from a current sensor and a reference voltage.

10. The apparatus of claim 6 wherein the second transistor blocks current flow under the control of a pulse width modulator signal through a preselected resistance value.

11. The apparatus of claim 6 wherein the selected location to sense the converter current is on the primary side of the transformer.

12. The apparatus of claim 6 wherein the selected location to sense the converter current is between the first and second transistors.

13. The apparatus of claim 3 wherein the first transistor disposed between the secondary transformer coil and ground is a plurality of parallel transistors.

14. A method of preventing current hogging in synchronous power converters having a duty cycle, comprising the steps of:

sensing a current value in each one of a plurality of transformers connected in parallel;

determining whether the current value is lower than a selected positive value; and responsive to the step of determining, breaking a circuit connection to a voltage source sinking a feedback current to block current flow during a period when the duty cycle is in an off state.

15. The method of claim 14 wherein the current sensing step is performed indirectly by use of magnetic fields.

16. The method of claim 14 wherein the current sensing step is performed directly on an output of the converter.

17. The method of claim 14 wherein the current sensing is performed on the primary side of an individual one of the plurality of transformers.

18. The method of claim 14 wherein the breaking connection step is performed using an operational amplifier to provide a signal to a transistor connected to ground to switch to an inactive state.

\* \* \* \* \*